(12) United States Patent
Zhi et al.

(10) Patent No.: US 12,646,143 B2
(45) Date of Patent: Jun. 2, 2026

(54) AUGMENTATION AND LAYER FREEZING FOR NEURAL NETWORK MODEL TRAINING

(71) Applicant: Lemon Inc., Grand Cayman (KY)

(72) Inventors: Tiancheng Zhi, Los Angleles, CA (US); Shen Sang, Los Angeles, CA (US); Jing Liu, Los Angeles, CA (US); Linjie Luo, Los Angeles, CA (US)

(73) Assignee: LEMON INC., Gran Cayman (KY)

( * ) Notice: Subject to any disclaimer, the term of this patent is extended or adjusted under 35 U.S.C. 154(b) by 319 days.

(21) Appl. No.: 18/208,761

(22) Filed: Jun. 12, 2023

(65) Prior Publication Data

US 2023/0325975 A1     Oct. 12, 2023

Related U.S. Application Data

(60) Provisional application No. 63/498,268, filed on Apr. 25, 2023.

(51) Int. Cl.
| | |
|---|---|
| *G06T 3/4046* | (2024.01) |
| *G06F 3/0482* | (2013.01) |
| *G06Q 10/40* | (2026.01) |
| *G06T 11/00* | (2006.01) |
| *G06T 5/50* | (2006.01) |

(Continued)

(52) U.S. Cl.
CPC .......... *G06T 3/4046* (2013.01); *G06F 3/0482* (2013.01); *G06Q 10/40* (2026.01); *G06T 11/00* (2013.01); *G06T 5/50* (2013.01); *G06T 5/60* (2024.01); *G06T 9/002* (2013.01); *G06T 2200/24* (2013.01); *G06T 2207/20024* (2013.01); *G06T 2207/20081* (2013.01); *G06T*

*2207/20084* (2013.01); *G06T 2207/20132* (2013.01); *G06T 2207/30201* (2013.01)

(58) Field of Classification Search
CPC ..... G06T 3/4046; G06T 11/00; G06F 3/0482; G06Q 50/01
USPC ......................................................... 382/155
See application file for complete search history.

(56) References Cited

U.S. PATENT DOCUMENTS 11,521,299 B2 * 12/2022 Perazzi .................... G06N 3/09
12,020,400 B2 * 6/2024 Hsieh ................... G06V 10/806
12,315,107 B2 * 5/2025 Akimoto ................ G06V 10/94
(Continued)

OTHER PUBLICATIONS

Lielacher A., et al., "How To Use Lensa AI Photo App To Create 'Magic Avatar'," Feb. 16, 2023, 19 pages, Retrieved from the Internet URL: https://web.archive.org/web/20230223050608/https://beincrypto.com/learn/how-to-use-lensa-ai/.
(Continued)

*Primary Examiner* — William D Titcomb
(74) *Attorney, Agent, or Firm* — Faegre Drinker Biddle & Reath LLP

(57) ABSTRACT

A method for training an image processor having a neural network model is described. A first training set of images having a first image resolution is generated. A second training set of images having a second image resolution is generated. The second image resolution is larger than the first image resolution. The neural network model of the image processor is trained using the first training set of images during a first training session. The neural network model of the image processor is trained using the second training set of images during a second training session after the first training session.

19 Claims, 8 Drawing Sheets

(51) Int. Cl.
  *G06T 5/60*  (2024.01)
  *G06T 9/00*  (2006.01)

(56)     References Cited

U.S. PATENT DOCUMENTS

| | | | |
|---|---|---|---|
| 2020/0026908 A1 | 1/2020 | Henderson et al. | |
| 2020/0234508 A1 | 7/2020 | Shaburov et al. | |
| 2021/0027100 A1 | 1/2021 | Bogdanovych et al. | |
| 2021/0074046 A1 | 3/2021 | Gong | |
| 2021/0089759 A1 | 3/2021 | Todorov | |
| 2021/0303826 A1 | 9/2021 | Voss et al. | |
| 2022/0101577 A1 | 3/2022 | Chakrabarty et al. | |
| 2022/0148276 A1 | 5/2022 | Golobokov et al. | |
| 2022/0207262 A1 | 6/2022 | Jeong et al. | |
| 2022/0237751 A1 | 7/2022 | Bradley et al. | |
| 2022/0360740 A1 | 11/2022 | Øhrn | |
| 2022/0398704 A1 | 12/2022 | Sun | |
| 2023/0122623 A1 | 4/2023 | Zhang et al. | |
| 2023/0132180 A1* | 4/2023 | Hsieh | G06T 7/11 |
| | | | 382/299 |
| 2023/0162407 A1 | 5/2023 | Kalarot et al. | |
| 2023/0230198 A1 | 7/2023 | Zhang et al. | |
| 2023/0316474 A1 | 10/2023 | Qu et al. | |
| 2023/0360182 A1 | 11/2023 | Fanello et al. | |
| 2023/0409631 A1 | 12/2023 | Futterman et al. | |
| 2024/0013344 A1* | 1/2024 | Honjo | H04N 21/4622 |
| 2024/0087085 A1* | 3/2024 | Liu | G06T 3/4046 |
| 2024/0098226 A1* | 3/2024 | Djukic | G06T 11/00 |
| 2024/0144496 A1* | 5/2024 | Lee | G06T 7/33 |
| 2024/0265586 A1* | 8/2024 | Zhao | G06N 3/0499 |
| 2024/0296606 A1 | 9/2024 | Smetanin et al. | |
| 2024/0297957 A1 | 9/2024 | Bakunov et al. | |
| 2024/0338868 A1 | 10/2024 | Wang et al. | |
| 2024/0386640 A1 | 11/2024 | Zhang et al. | |
| 2025/0005808 A1 | 1/2025 | Yin et al. | |
| 2025/0014256 A1 | 1/2025 | Toma et al. | |
| 2025/0111473 A1* | 4/2025 | Andrew | G06T 3/4046 |

OTHER PUBLICATIONS

Non-Final Office Action for U.S. Appl. No. 18/355,345, mailed May 8, 2025, 30 pages.

Orr A., "How to use Lensa and its AI art features on iPhone," AppleInsider, Dec. 19, 2022, 6 pages, Retrieved from the Internet URL: https://web.archive.org/web/20230220130846/https://appleinsider.com/inside/iphone/tips/how-to-use-lensa-and-its-ai-art-features-on-iphone.

Sha A., "What is Lensa AI App and How to Use It?," Beebom, Dec. 8, 2022, 13 pages, Retrieved from the Internet URL: https://web.archive.org/web/20230329222918/https://beebom.com/what-is-lensa-ai-app-how-to-use/.

Nataniel Ruiz et al., DreamBooth: Fine Tuning Text-to-Image Diffusion Models for Subject-Driven Generation, https://arxiv.org/abs/2208.12242, arXiv:2208.12242v2 [cs.CV] Mar. 15, 2023.

Rinon Gal et al., Encoder-based Domain Tuning for Fast Personalization of Text-to-Image Models,https://arxiv.org/abs/2302.12228, arXiv:2302.12228v3 [cs.CV] Mar. 5, 2023.

Yuxiang Wei et al., ELITE: Encoding Visual Concepts into Textual Embeddings for Customized Text-to-Image Generation, https://arxiv.org/abs/2302.13848, arXiv:2302.13848v2 [cs.CV] Aug. 18, 2023.

Jing Shi et al., InstantBooth: Personalized Text-to-Image Generation without Test-Time Finetuning, https://jshi31.github.io/InstantBooth/, Aug. 30, 2023.

Robin Rombach et al., High-Resolution Image Synthesis with Latent Diffusion Models, arXiv:2112.10752v2 [cs.CV] Apr. 13, 2022.

Olaf Ronneberger et al., U-Net: Convolutional Networks for Biomedical Image Segmentation, arXiv: 1505.04597v1 [cs.CV] May 18, 2015.

Jing Shi et al., InstantBooth: Personalized Text-to-Image Generation without Test-Time Finetuning, arXiv:2304.03411v1 [cs.CV] Apr. 6, 2023.

Liu B., et al., "Machine Learning Diffusion Model With Image Encoder Trained for Synthetic Image Generation," U.S. Appl. No. 18/172,192, filed Feb. 21, 2023, 47 Pages.

Rogers R., "What You Should Know Before Using the Lensa AI App, Are You Thinking about Uploading Some Selfies and Buying a Pack of 'Magic Avatars' Consider these Expert Tips First," WIRED, Dec. 9, 2022, 6 Pages, Retrieved from URL: www.wired.com/story/lensa-ai-magic-avatars-security-tips/.

Non-Final Office Action mailed Feb. 9, 2026 in U.S. Appl. No. 18/355,345.

* cited by examiner

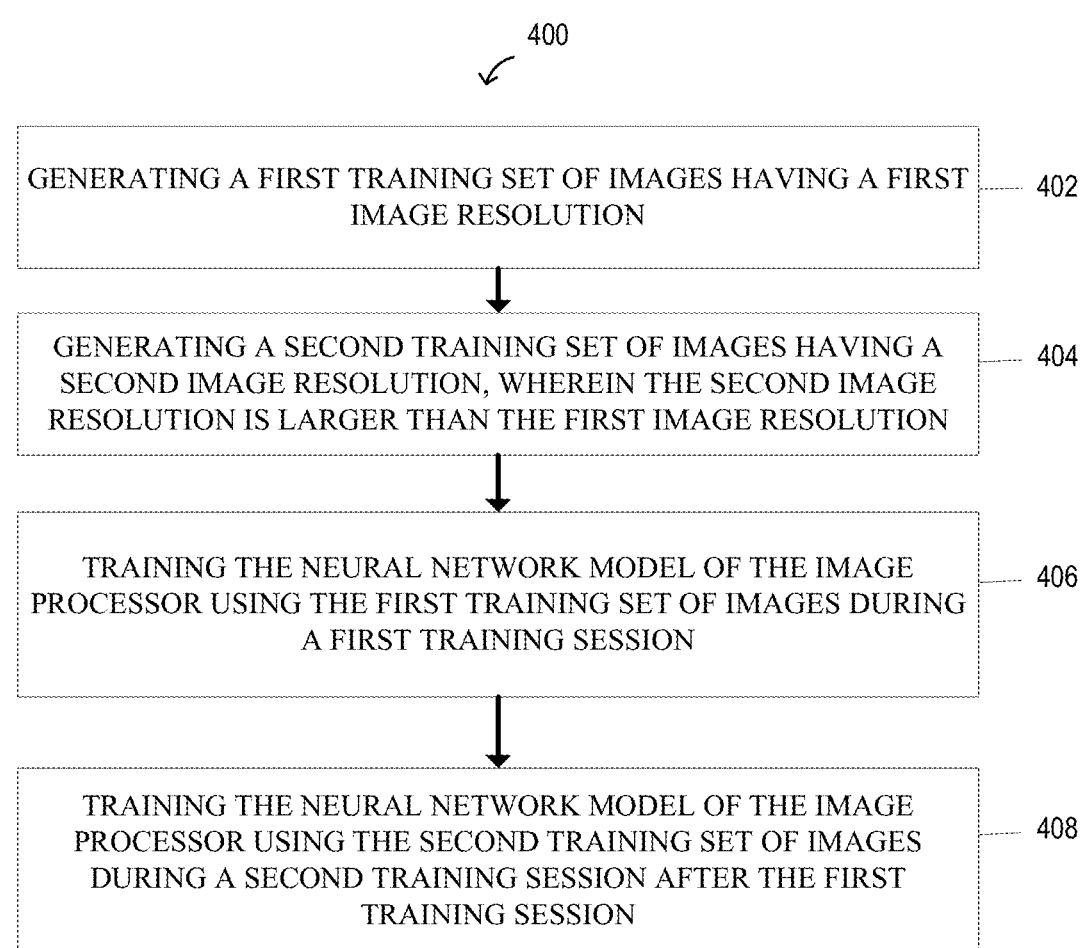

400

GENERATING A FIRST TRAINING SET OF IMAGES HAVING A FIRST IMAGE RESOLUTION —— 402

GENERATING A SECOND TRAINING SET OF IMAGES HAVING A SECOND IMAGE RESOLUTION, WHEREIN THE SECOND IMAGE RESOLUTION IS LARGER THAN THE FIRST IMAGE RESOLUTION —— 404

TRAINING THE NEURAL NETWORK MODEL OF THE IMAGE PROCESSOR USING THE FIRST TRAINING SET OF IMAGES DURING A FIRST TRAINING SESSION —— 406

TRAINING THE NEURAL NETWORK MODEL OF THE IMAGE PROCESSOR USING THE SECOND TRAINING SET OF IMAGES DURING A SECOND TRAINING SESSION AFTER THE FIRST TRAINING SESSION —— 408

GENERATING A TRAINING SET OF IMAGES — 502

AUGMENTING AT LEAST SOME IMAGES OF THE FIRST TRAINING SET — 504

ADDING THE AUGMENTED IMAGES TO THE TRAINING SET — 506

TRAINING THE NEURAL NETWORK MODEL OF THE IMAGE PROCESSOR USING THE TRAINING SET OF IMAGES — 508

AUGMENTATION AND LAYER FREEZING FOR NEURAL NETWORK MODEL TRAINING

CROSS-REFERENCE TO RELATED APPLICATIONS

This application claims priority to U.S. Provisional Patent Application No. 63/498,268, filed Apr. 25, 2023, entitled "Server Device Providing Social Media Platform With AI Avatar Generation," which is incorporated herein by reference in its entirety.

BACKGROUND

Users of a social media platform may select an avatar or other image to represent their user accounts. These images differentiate users, which can be helpful when a user is adding another user to a network of friends, browsing through a list of users, or even identifying who is posting on within a feed. Typically, a default icon is used when a user has not uploaded or selected an avatar to be associated with their account, and some systems may allow a user to select from pre-set stock avatars. In particular, casual users of a social media platform may be less motivated to select an image or to take a picture of their own face to upload and share publicly. Lacking an identifying avatar, such users with default icons may be less likely to form connections with other users and more likely to decrease use of the social media platform as a result. Thus, encouraging users to adopt a personalized avatar can increase user engagement and retention.

Neural network models may be used to help a user select a personalized avatar by automatically generating the avatar based on images of the user. In this way, a user may be more likely to use a more unique, personalized avatar to promote connections with other users, while avoiding the use of an actual image to maintain a balance of privacy. However, training such neural network models is often time consuming and resource intensive. Moreover, use of the trained model may also be time and resource intensive, making it less likely for a casual user to select a personalized avatar.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to image processors for image generation.

In one aspect, a method for training an image processor having a neural network model is provided. The method comprises: generating a first training set of images having a first image resolution; generating a second training set of images having a second image resolution, wherein the second image resolution is larger than the first image resolution; training the neural network model of the image processor using the first training set of images during a first training session; training the neural network model of the image processor using the second training set of images during a second training session after the first training session.

In another aspect, a method for training an image processor having a neural network model with a noise processor is provided. The method comprises: generating a training set of images; augmenting at least some images of the first training set; adding the augmented images to the training set; training the neural network model of the image processor using the training set of images.

In yet another aspect, a system for training an image processor having a neural network model is provided. The system comprises the image processor having the neural network model, where the neural network model has a noise processor. The system further comprises an augmentation processor configured to process input images to generate a first training set of images having a first image resolution and a second training set of images having a second image resolution. The second image resolution is larger than the first image resolution. The noise processor is trained using the first training set of images during a first training session and using the second training set of images during a second training session. The second training session is after the first training session.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 4 shows a flowchart of an example method for training an image processor having a neural network model, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of an image generation system having a neural network model and method for training the image generation system. The image generation system generates output images, such as avatar images for a user profile, based on one or more input images using a neural network model. However, the image generation system uses one or more data augmentation processes to improve both training of the neural network model and use of the trained neural network model. For example, training data sets are generated using augmented images, which allows for longer training sessions with lower risks of overfitting the output images to the input images. The data augmentation processes also improve a speed of training the neural network model and improve a speed of generating the output images. Additionally, the image generation system operates effectively using only a small number of input images.

Figure 1:
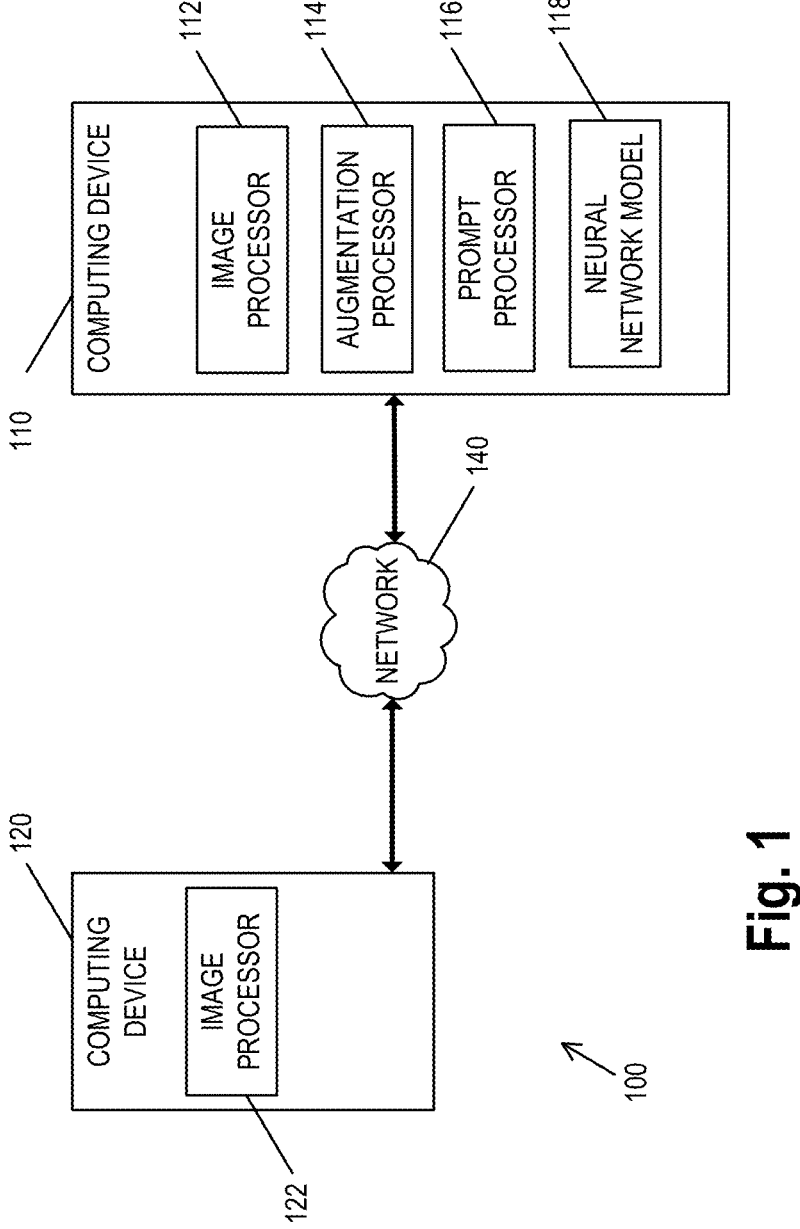
FIG. 1 shows a block diagram of an example of an image generation system, according to an example embodiment.

This and many further embodiments for a computing device are described herein. For instance, FIG. 1 shows a block diagram of an example of an image generation system 100, according to an example embodiment. Generally, the image generation system 100 is configured to generate images, such as personalized avatars, based on input images from a target user. However, the image generation system 100 is configured to be trained more quickly and/or with fewer processing resources than typical avatar generation engines. Moreover, the image generation system 100 is configured to generate images more quickly and/or with fewer processing resources. Advantageously, the image generation system 100 is more easily updated (e.g., to provide new styles of avatars) and more likely to be used by casual users due to reduced wait times for generated images. To do so, in various examples, the image generation system 100 is at least partially trained using images having a reduced image resolution, which reduces processing resources for training. Moreover, the image generation system 100 may be trained using input images as well as augmented images based on the input images, which reduces a number of images needed for training. In some examples, the image generation system 100 may be trained using attention layer freezing, which reduces processing resources for training.

The system 100 includes a computing device 110 that is configured to generate images, such as personalized avatars, and may further include a computing device 120 that is configured as a user device for a user that desires a personalized avatar. The computing device 110 may be any suitable type of computing device, including a desktop computer or PC (personal computer), server, distributed computing platform, or cloud platform device. In some examples, the computing device 110 is part of a social media platform or service, image or video sharing platform or service, or provides other suitable applications to users. The computing device 110 may be configured to execute one or more software applications (or "applications") and/or services and/or manage hardware resources (e.g., processors, memory, etc.), which may be utilized by users of the computing device 110 and/or users of the computing device 120.

The computing device 120 may be similar to the computing device 110, or may include one or more mobile computer or mobile computing devices (e.g., a laptop computer, a notebook computer, a tablet computer such as an Apple iPad™, a netbook, etc.), or other computing devices. In some examples, both the computing devices 110 and computing devices 120 may be mobile computing devices, stationary computing devices, server devices, distributed computing platforms, and/or cloud platform devices. For ease of discussion, the description herein refers to a single computing device 110, but features and examples of the computing device 110 are applicable to two, three, or more instances of the computing devices 110. Similarly, the description herein refers to a single computing device 120, but features and examples of the computing device 120 are applicable to two, three, or more instances of the computing devices 120.

In the examples described herein, the computing device 110 is generally described as being implemented as a server (e.g., cloud server or network server), while the computing device 120 is implemented as a client, such as a mobile phone. The computing devices 110 and 120 may be communicatively coupled via a network 140, in some examples. Network 140 may comprise one or more networks such as local area networks (LANs), wide area networks (WANs), enterprise networks, the Internet, etc., and may include one or more of wired and/or wireless portions. Computing device 110 and computing device 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

The computing device 110 comprises an image processor 112 and an augmentation processor 114. In some examples, the computing device 110 further comprises a prompt processor 116 and/or a neural network model 118. The image processor 112 may be implemented as a text to image model configured to receive a text description and generate an output image based on the text description. The text description may be referred to as a prompt and, in some examples, may be in a natural language format. In other words, the prompt may be written in a conversational way that is readily understood by users (e.g., casual users of a social media platform), even without special training on computers or neural network models. In some examples, the prompt may combine natural language with other information in a suitable text data format, such as a text-based vector of elements. Examples of the image processor 112 may include Stable Diffusion, DALL-E, Imagen, Midjourney, or other suitable text to image processors. In the examples described herein, the image processor 112 is Stable Diffusion or similar diffusion models, having a noise processor configured to iteratively denoise a noisy image through a number of layers. Denoising of the image is based on a prompt that conditions the noise processor, as described below. As described above, in some examples, at least some layers of the noise processor are frozen during training to reduce processing resources used for training.

In some examples, the computing device 120 comprises an image processor 122, which may be generally similar to the image processor 112. However, the image processor 122 is generally a trained instance of the image processor 112 and may use weights and/or parameters based on training sessions of the image processor 112, for example.

Training of the image processor 112 may be further improved, in some examples, by the augmentation processor 114. To do so, the augmentation processor 114 processes input images or augments them to generate augmented images. The augmented images may be used in addition to the input images to create diversity in a training session for the image processor 112. In one example, the augmentation processor 114 supports a resolution scheduling for the image processor 112, where instead of using full resolution images as part of a training set of images, the image processor 112 is trained using images having smaller image resolution for at least some steps of a training session, followed by full resolution images for a subsequent training session. In various examples, two, three, or more resolutions of images are used across the training sessions (e.g., 64×64 pixel images, 128×128 pixel images, 512×512 pixel images, etc.). In other examples, the augmentation processor 114 performs a crop augmentation to crop a portion of an input image. Cropping the input image may provide improved diversification of the input images. In still other examples, the augmentation processor 114 performs a stylization augmentation. For example, the augmentation processor 114 may apply a style filter to an input image that changes an art style, lighting, texture, color balance, etc. of the input image to a desired artwork domain.

As described above, denoising of an image is based on a prompt that conditions the noise processor of the image processor 112 to generate an output image based on the prompt. The prompt processor 116 is configured to generate prompts for the noise processor using tokens that are based on an input image. For example, an input image may be converted to a text domain (e.g., natural language, vectors, etc.), specifically, into a plurality of tokens that represent the input image using an image encoder. Generally, features of the input image, such as its subject and characteristics of the subject, along with features of a remainder of the image (e.g., a background, or secondary subjects) may be encoded into a plurality of tokens, with initial tokens corresponding to the subject and subsequent tokens corresponding to the remainder of the image. To improve training of the noise processor, the prompt processor 116 uses a subset of the plurality of tokens to condition the noise processor. In this way, processing resources for training may be reduced due to less complexity from having fewer tokens.

In some examples, the neural network model 118 is used, in addition to the image processor 112, to provide style filters to input images that are to be processed by the image processor 112. Generally, the neural network model 118 is a pretrained neural network model, such as a generative adversarial network or other suitable model that converts an input image into an output image having a desired style. Although only one instance of the neural network model 118 is shown, other examples of the image processing system 100 may have two, three, or more different instances of the neural network model 118 to generate different images with different art styles or other features.

Although only the computing device 110 and the computing device 120 are shown in FIG. 1, the image generation system 100 may further comprise a data store (not shown) that stores training images, parameters for neural network models, or other suitable data.

Figure 2:
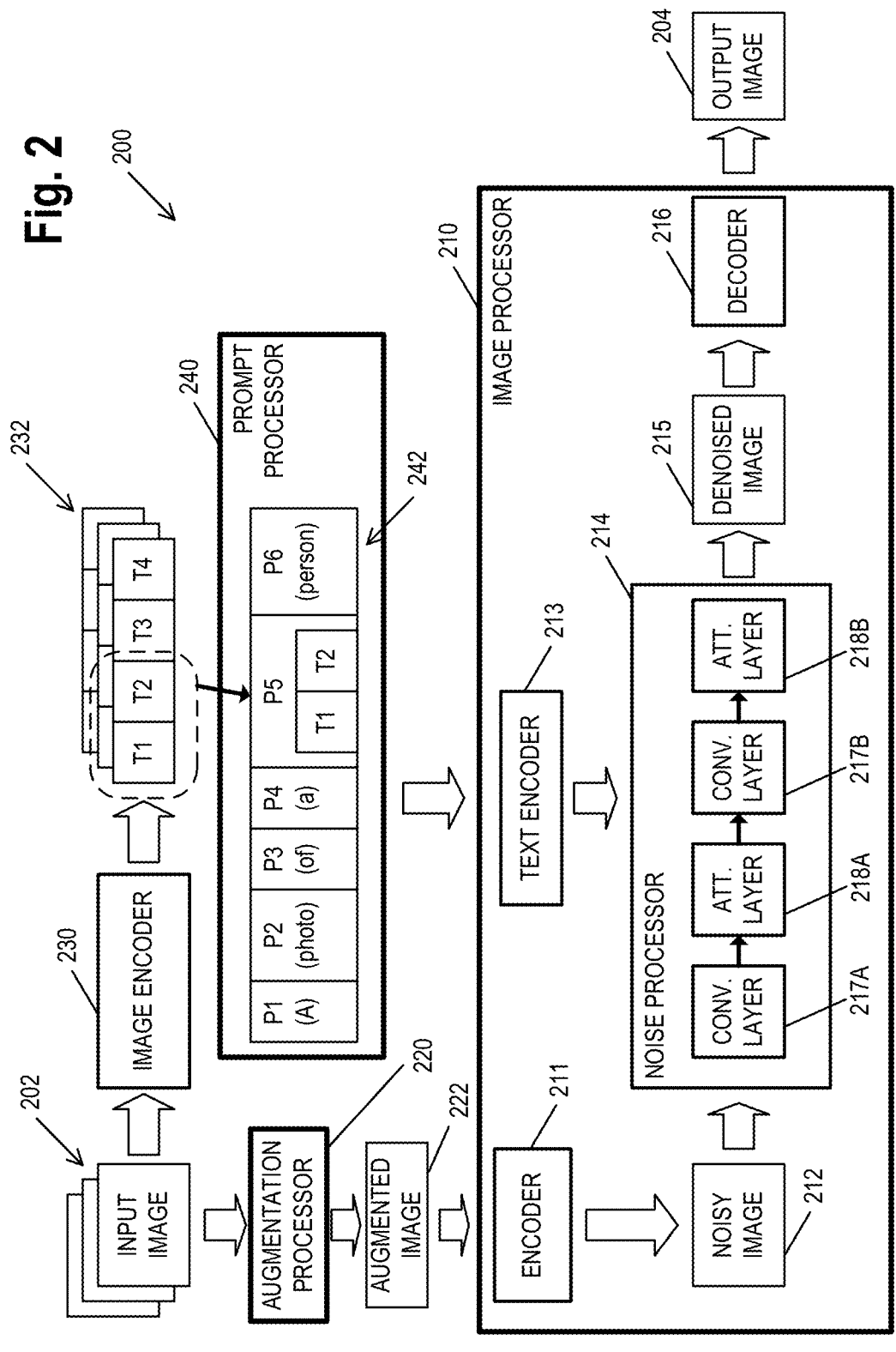
FIG. 2 shows a block diagram of another example of an image generation system, according to an example embodiment.

FIG. 2 shows a block diagram of another example of an image generation system 200, according to an example embodiment. The image generation system 200 is configured to receive one or more input images 202 and generate a suitable output image 204 based on the input images 202. In some examples, the input images 202 contain only one primary subject (i.e., the target user). In other examples, the input images 202 may contain additional subjects. In some examples, the image generation system 200 receives three, four, or more different images of a subject (e.g., a target user) and the image generation system 200 generates a stylized and/or personalized avatar image as the output image 204.

The image generation system 200 comprises an image processor 210 that generates the output images 204, an augmentation processor 220, and a prompt processor 240, which may generally correspond to the image processor 112, the augmentation processor 114, and the prompt processor 116, respectively. As described above, the image processor 210 may, in some examples, correspond to a Stable Diffusion neural network model that performs a denoising process based on a prompt 242 to generate the output image 204. Generally, the prompt 242 may be a caption or sentence for an image, text-based description of an image (or group of images), or other suitable text prompt for image generation. The prompt 242 may be a text field, string, or other characters that combines natural language with other information in a suitable text data format, such as a text-based vector of elements, for example. Generally, the prompt 242 is used to condition the image processor 210, thereby influencing the output image 204.

Since the image processor 210 is configured to process a text-based description, the input image 202 is converted into a text domain by an image encoder 230 so that the input images 202 can be readily processed by the image processor 210. For example, the image encoder 230 generates a plurality of tokens 232 (shown as T1, T2, T3, T4) that represent the input image 202, where features of the input image 202, such as its subject (or target user) and characteristics of the subject, along with features of a remainder of the image 202 (e.g., a background, or secondary subjects) are encoded into the plurality of tokens 232. Each token may be a word that maps to a vector having multiple dimensions. In the examples described herein, each token corresponds to vector having 768 dimensions, but vectors having fewer dimensions or more dimensions may be used in other examples.

Generally, the plurality of tokens 232 comprises initial tokens (T1, T2) corresponding to the subject and subsequent tokens (T3, T4) corresponding to the remainder of the image. In some examples, each of the plurality of tokens 232 is processed by the prompt processor 240 to generate the prompt 242. In other examples, only a subset of the plurality of tokens 232 is processed to generate the prompt 242. As described above, several input images 202 may be used to generate the output image 204. In some examples, each input image 202 is encoded by the image encoder 230 to generate respective pluralities of tokens 232 and the individual tokens are averaged, weighted, or combined in a suitable manner before being passed to the prompt processor 240. For example, T1 may be passed as the average value (or vector of values) for the first token of four different input images. In some examples, the values of the tokens are weighted according to criteria for ranking the input image 202. In some scenarios, an input image 202 having high quality lighting (e.g., few shadows) and high resolution may be weighted more than another input image 202 having poor lighting, obscured features (e.g., wearing a hat or with an obstruction over part of the subject's face).

The prompt 242 represents a desired image style and/or subject for the output image 202. In the example shown in FIG. 2, the prompt 242 has six words, P1 through P6, where P5 is a field based on the plurality of tokens 232. For example, the prompt 242 may be a text string or caption of "A photo of a T1-T2 (person)", where T1-T2 is a "pseudo-word" that represents a vector for the plurality of tokens 232

(e.g., a target concept in a word embedding space). By using the pseudo-word, the target concept can be synthesized or edited using the flexibility of text prompts. Accordingly, the image processor 210 learns a "concept" of a target user based on the input images 202, through the prompt 242. In some examples, the prompt processor 240 generates the prompt 242 based on one or more templates that are filled in with the selected tokens, such as "A photo of a _____", "An image having a _____", "A representation of _____".

In the example shown in FIG. 2, the prompt 242 includes a subject category identifier ("person") that indicates a category of the subject and may improve quality of the output image 204. In other examples, the subject category identifier may be "car", "building", "dog", or other suitable identifier. In some examples, the subject category identifier is omitted. To improve training of the noise processor 210, the prompt processor 240 may use a subset of the plurality of tokens 232 to generate the prompt 242 and thereby condition the image processor 210. In this way, processing resources for training may be reduced due to less complexity from having fewer tokens to be processed. In the example shown in FIG. 2, only two tokens T1 and T2 are incorporated into the prompt 242. In other examples, only one token (T1) is incorporated into the prompt 242.

The image processor 210 comprises an encoder 211, a noise processor 214, a text encoder 213, and a decoder 216. Generally, the encoder 211 may generate a noisy image 212, for example, by introducing noise to an input image 202 or augmented image 222. The introduced noise may be Gaussian noise, pseudo-random noise, or other suitable noise. The noise processor 214 comprises a plurality of processing layers 217 and 218 that iteratively denoise the noisy image 212 to generate a denoised image 215. The decoder 216 processes the denoised image 215 to generate the output image 204. In some examples, the noise processor 214 is implemented as UNet model, while the encoder 211 and decoder 216 are implemented as an autoencoder model. Generally, the noise processor 214 attempts to predict the noise introduced to the input image 202 and a suitable loss function is used to train the noise processor 214. In some examples, the decoder 216 comprises an upsampling processor or neural network model configured to generate a high resolution image (e.g., 512×512 or more) from a low resolution image (e.g., 64×64 or less).

The prompt 242 is processed by the text encoder 213 to generate an encoded prompt (not shown) that conditions at least some of the processing layers of the noise processor 214. In some examples, the text encoder 213 is a pretrained transformer language model which transforms a text prompt to an encoded prompt (e.g., an embedding space). In one such example, the text encoder 213 is the CLIP ViT-L/14 text encoder that generates the encoded prompt as a 77×768 dimensional token embedding.

In some examples, training of the image processor 210 may be performed using augmented images 222 from the augmentation processor 220. Examples of augmentation include resolution scheduling, cropping, stylization, or other suitable augmentations. For resolution scheduling, different training sets of images are generated by the augmentation processor 220 where the different training sets have images with different image resolutions. For example, the augmentation processor 220 may generate a first training set of images having a first image resolution (e.g., 64×64) and generate a second training set of images having a second image resolution (e.g., 128×128) so that the second image resolution is larger than the first image resolution. Training of the image processor 210 may then be performed in sessions, specifically, a first training session using the first training set and in a second training session after the first training session using the second training set. Generally, by using the images having a smaller image resolution first, training of the image processor 210 may proceed using fewer processing resources than if full-size images were used for an entire training period. In some examples, a third training set or even additional training sets having larger image resolutions (e.g., 256×256, 512×512, etc.) are used in subsequent training sessions. In some examples, the different training sets have different numbers of images. For example, training sets having images with smaller image resolution may have more images than training sets having images with larger image resolutions. As one example, the first training set may have 1024 images having an image resolution of 64×64, while the second training set may have 512 images having an image resolution of 128×128. In still other examples, the training sets each have a range of image resolutions, but with generally larger image sizes in some training sets. For example, the first training set may have image resolutions between 64×64 and 127×127, while the second training set may have image resolutions between 128×128 and 255×255.

In some examples, the different training sets are based on the same images, but with different image resolutions. In other words, a first image of a dog at full-size resolution may be 512×512 pixels and placed into the third training set, while a first augmented image 222 based on the first image is resized by the augmentation processor 220 to have an image resolution of 256×256 and placed in the second training set. Similarly, a second augmented image 222 based on the first image (or on the first augmented image 222) is resized by the augmentation processor 220 to have an image resolution of 128×128 and placed in the first training set.

The augmentation processor 220 may also be configured to perform a crop augmentation to crop a portion of an input image 202. Cropping the input image 202 may provide improved diversification of the input images and thus improve an output quality of the output image 204, in some scenarios. In various scenarios, the augmentation processor 220 may crop one or more sides of the image (augmented image 304, FIG. 3), crop using a chord between different sides (augmented image 306, FIG. 3), or perform other crop patterns. In some examples, the augmentation processor 220 re-centers the augmented image 222 on the subject or face of a target user within the augmented image 222. In still other examples, the augmentation processor 220 moves the subject or face to another position (e.g., offset to a side or top of the image) within the augmented image 222.

The augmentation processor 220 may also be configured to perform a stylization augmentation to generate the augmented image 222. For example, the augmentation processor 220 may apply a style filter to an input image 202 that changes an art style, lighting, texture, color balance, etc. of the input image 202 to a desired style or artwork domain. In some examples, the augmentation processor 220 performs different stylization augmentations to a same input image 202 so that a plurality of stylized augmented images 222 are generated based on a single input image.

As described above, the noise processor 214 comprises a plurality of processing layers 217 and 218 that iteratively denoise the noisy image 212 to generate a denoised image 215. The processing layers may include convolution layers 217 and attention layers 218, arranged in an interleaved pattern. Although only four layers are shown in FIG. 2 for clarity, the noise processor 214 may have additional layers. For example, the noise processor 214 may have additional types of layers (e.g., normalization layers) or additional instances of the convolution layers, attention layers, etc. To reduce processing resources used for training the noise processor 214, at least some layers of the noise processor 214 are frozen during one or more training sessions. For example, attention layers 218A and 218B may be frozen during at least some training sessions. In some examples, only a subset of attention layers are frozen during training. In other examples, all of the attention layers are frozen during training. Moreover, in some examples, all or some of the attention layers are frozen for only some training sessions (e.g., in combination with resolution scheduling, described above).

Figure 3:
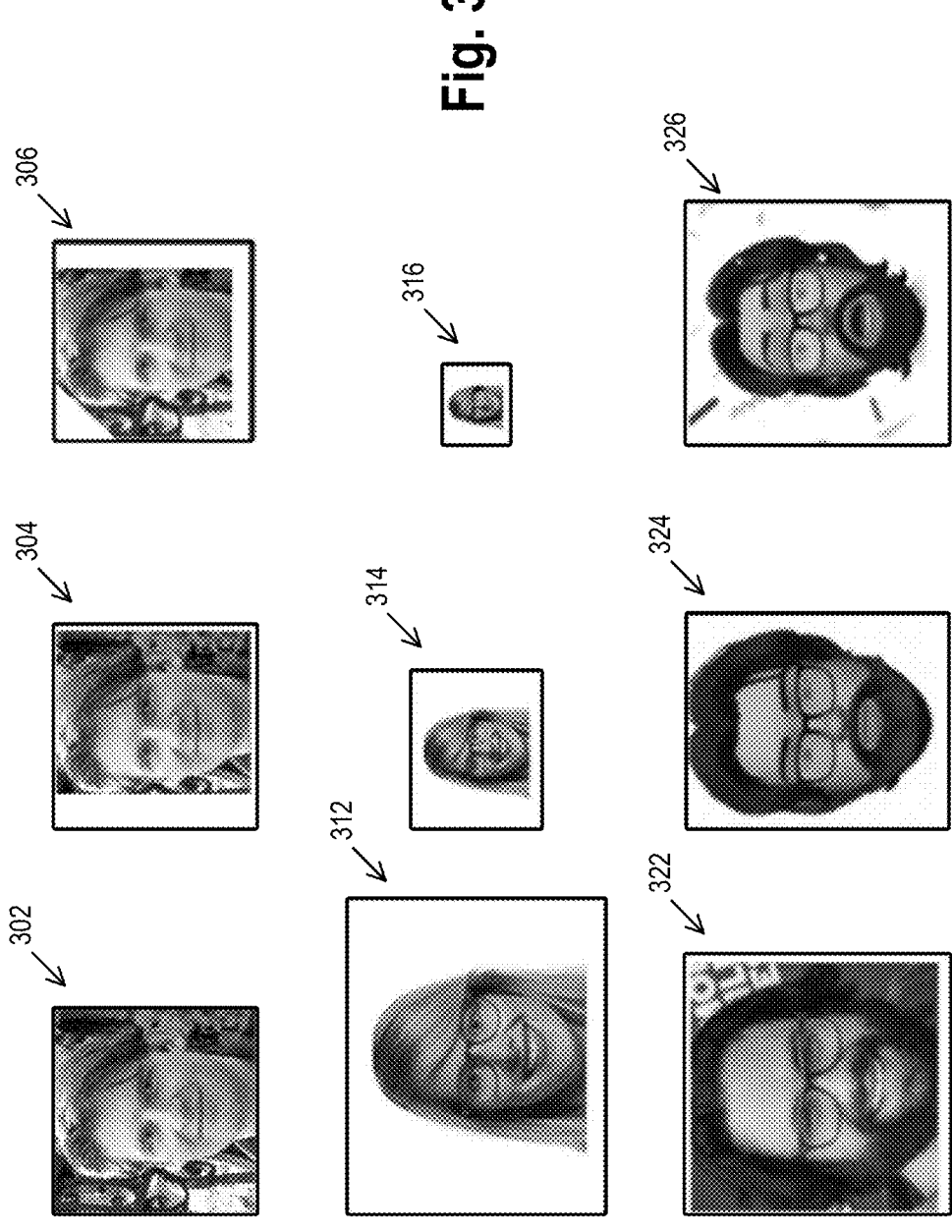
FIG. 3 shows a diagram of example augmented images for training an image generation system, according to an example embodiment.

FIG. 3 shows a diagram of example augmented images for training an image generation system, according to an example embodiment. The augmented images may be generated from input images by the augmentation processor 114 or 220, for example. In the examples shown in FIG. 3, an input image 302 is augmented and cropped by the augmentation processor to generate an augmented image 304 and an augmented image 306. The augmented image 304 is cropped along a left edge. The augmented image 306 is cropped along a right edge, a lower edge, and further cropped along a chord between the top and left edges. Accordingly, the augmented images 304 and 306 have different crop boundaries. Although only two cropped versions of the input image 302 are shown, the augmentation processor 114 or 220 may generate three, four, or more augmented images having different crop boundaries, in various examples.

An input image 312 may be augmented by the augmentation processor 220 to have a reduced image resolution, shown as augmented images 314 and 316. As described above, augmented images having a reduced image resolution may be placed in a training set for training sessions that use fewer processing resources.

The augmentation processor 220 may perform a stylization augmentation to an input image 322 and generate the augmented images 324 and 326. In the example shown in FIG. 3, the augmented image 324 has a cartoon style applied, while the augmented image 326 has a surprised face filter applied. Other variations of stylization augmentation will be apparent to those skilled in the art. In some examples, the augmentation processor 220 comprises one or more neural network models (not shown) to perform different stylization augmentations. In other examples, the augmentation processor 220 uses an external neural network model (e.g., neural network model 118) to perform the stylization augmentation.

FIG. 4 shows a flowchart of an example method 400 for training an image processor having a neural network model, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the computing device 120 (e.g., via the image processor 112, the augmentation processor 114, the prompt processor 116, and/or the neural network model 118), the image generation system 200 (e.g., via the image processor 210, the augmentation processor 220, and/or the prompt processor 240), or other suitable computing device.

Method 400 begins with step 402. At step 402, a first training set of images having a first image resolution is generated. The first training set may be generated by the augmentation processor 114 or the augmentation processor 220, for example. The first training set may include images with a lower resolution, such as augmented image 316.

At step 404, a second training set of images having a second image resolution is generated. The second image resolution is larger than the first image resolution. The second training set may be generated by the augmentation processor 114 or the augmentation processor 220, for example. The second training set may include images with a relatively higher resolution, such as augmented image 314. In some examples, the first training set has more images than the second training set. For example, the first training set may have 1024 images while the second training set has 512 images. In some examples, subjects of images of the first training set are distinct from subjects of images of the second training set. In other examples, images of the first training set and the second training set have same respective subjects (e.g., the images in both training sets have a same person, dog, car, etc.).

At step 406, the neural network model of the image processor is trained using the first training set of images during a first training session. For example, the image processor 210 may train one or more of the noise processor 214, the encoder 211, and/or the decoder 216.

At step 408, the neural network model of the image processor is trained using the second training set of images during a second training session after the first training session.

In some examples, the method 400 further comprises generating a third training set of images having a third image resolution, where the third image resolution is larger than the second image resolution. The neural network model of the image processor is then trained using the third training set of images during a third training session after the second training session. The third training set of images may correspond to the input image 312, for example.

In some examples, the neural network model comprises a noise processor having convolution layers and attention layers. The method 400 may further comprise freezing at least some of the attention layers of the noise processor during at least one of the first training session and the second training session. For example, the noise processor 214 comprises convolution layers 217 and attention layers 218 and at least some of the attention layers may be frozen. In some examples, all of the attention layers of the noise processor are frozen during the at least one of the first training session and the second training session. In still other examples, all of the attention layers of the noise processor are frozen during both of the first training session and the second training session.

The neural network model may comprise a noise processor training the neural network model of the image processor using the first training set of images during the first training session may comprise: augmenting at least some images of the first training set; and adding the augmented images to the first training set. For example, the augmentation processor 112 or 220 may generate the augmented images 222 and place them in the first training set. Generating the augmented images may comprise one or more of cropping an image of the at least some images and processing an image of the at least some images using a style filter. In some examples, the method 400 may further comprise generating a plurality of tokens that represent an image of the first training set using an image encoder, generating a prompt for the noise processor using a subset of the plurality of tokens, encoding the prompt using a text encoder, and conditioning the noise processor using the encoded prompt. For example, the image encoder 230 may generate the plurality of tokens 232 and the prompt processor 240 may generate the prompt 242. Further, the text encoder 213 may encode the prompt 242 into an encoded prompt (not shown) for conditioning the noise processor 214.

Figure 5:
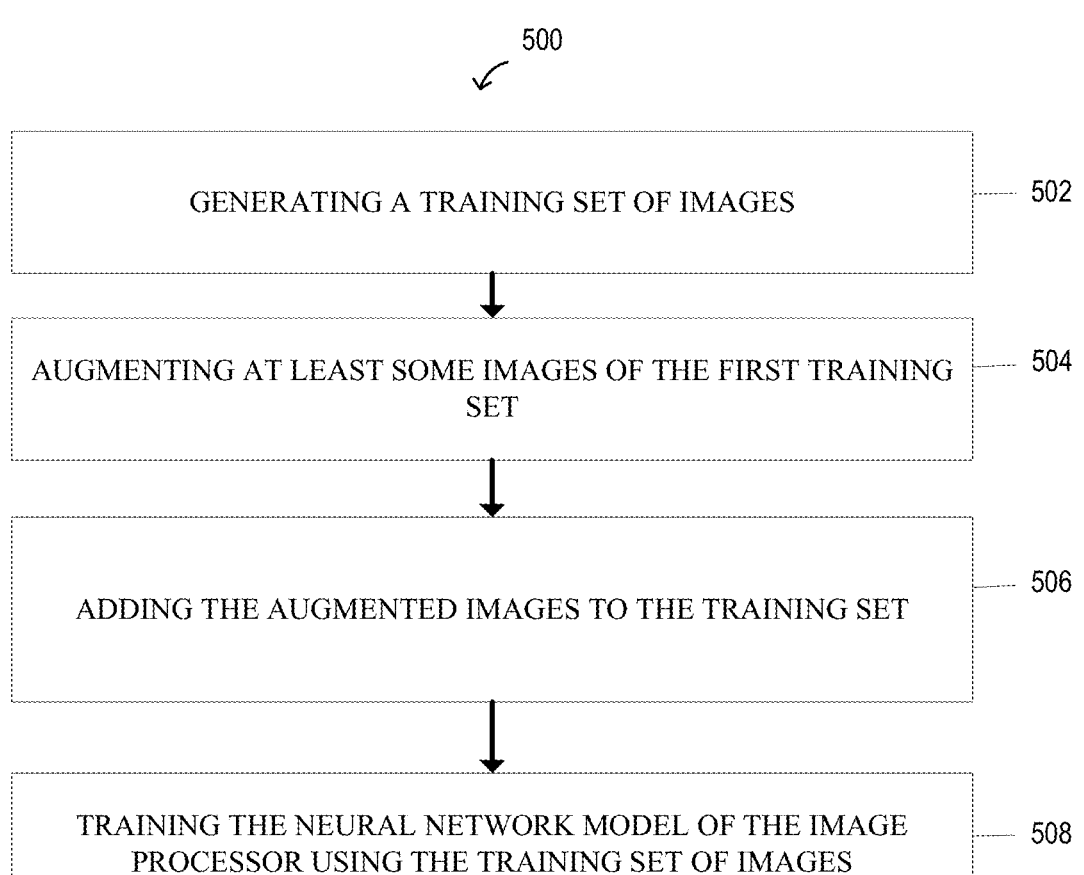
FIG. 5 shows a flowchart of another example method for training an image processor having a neural network model, according to an example embodiment.

FIG. 5 shows a flowchart of an example method 500 for training an image processor having a neural network model, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 120 (e.g., via the image processor 112, the augmentation processor 114, the prompt processor 116, and/or the neural network model 118), the image generation system 200 (e.g., via the image processor 210, the augmentation processor 220, and/or the prompt processor 240), or other suitable computing device.

Method 500 begins with step 502. At step 502, a training set of images is generated. For example, the input images 202 may be generated or received from a user.

At step 504, at least some images of the first training set are augmented. For example, the augmentation processor 114 or the augmentation processor 220 may augment one or more of the input images 202 to generate augmented images 222.

At step 506, the augmented images are added to the training set.

At step 508, the neural network model of the image processor is trained using the training set of images. For example, the image processor 210 may train one or more of the noise processor 214, the encoder 211, and/or the decoder 216.

In some examples, augmenting the images comprises cropping a first image of the at least some images to generate a first augmented image. Adding the augmented images to the training set may comprise adding the first augmented image to the training set.

In other examples, augmenting the images comprises cropping the first image to generate a second augmented image having a different crop boundary from the first augmented image. Adding the augmented image to the training set may comprise adding the second augmented image to the training set.

In still other examples, augmenting the at least some images comprises processing a first image of the at least some images using a style filter to generate a first augmented image. Adding the augmented image to the training set may comprise adding the first augmented image to the training set.

In some examples, augmenting the at least some images comprises cropping a second image of the at least some images to generate a second augmented image. Adding the augmented images to the training set may comprise adding the second augmented image to the training set.

Figure 6:
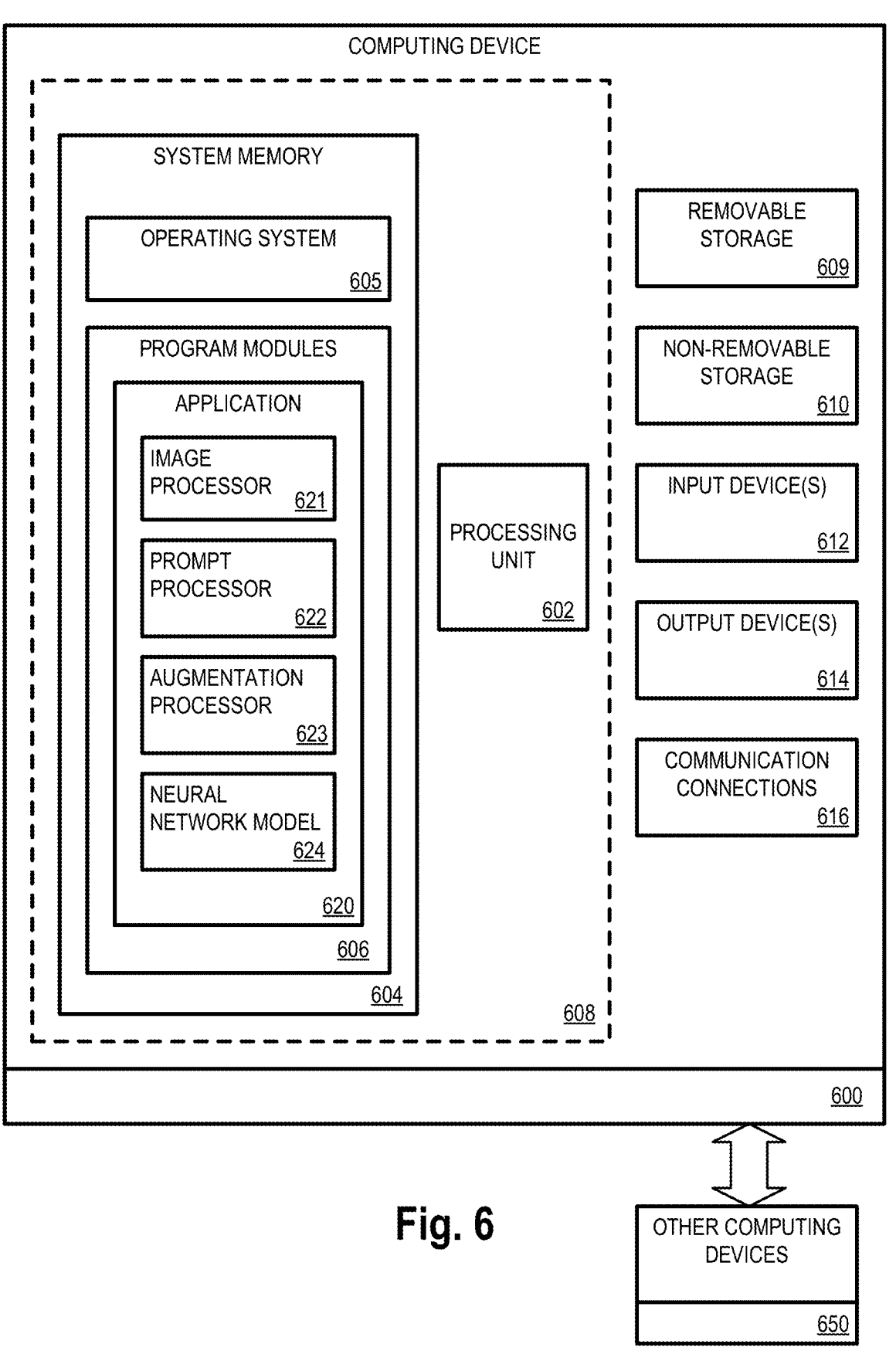
FIG. 6 is a block diagram illustrating example physical components of a computing device with which aspects of the disclosure may be practiced.
Figure 7:
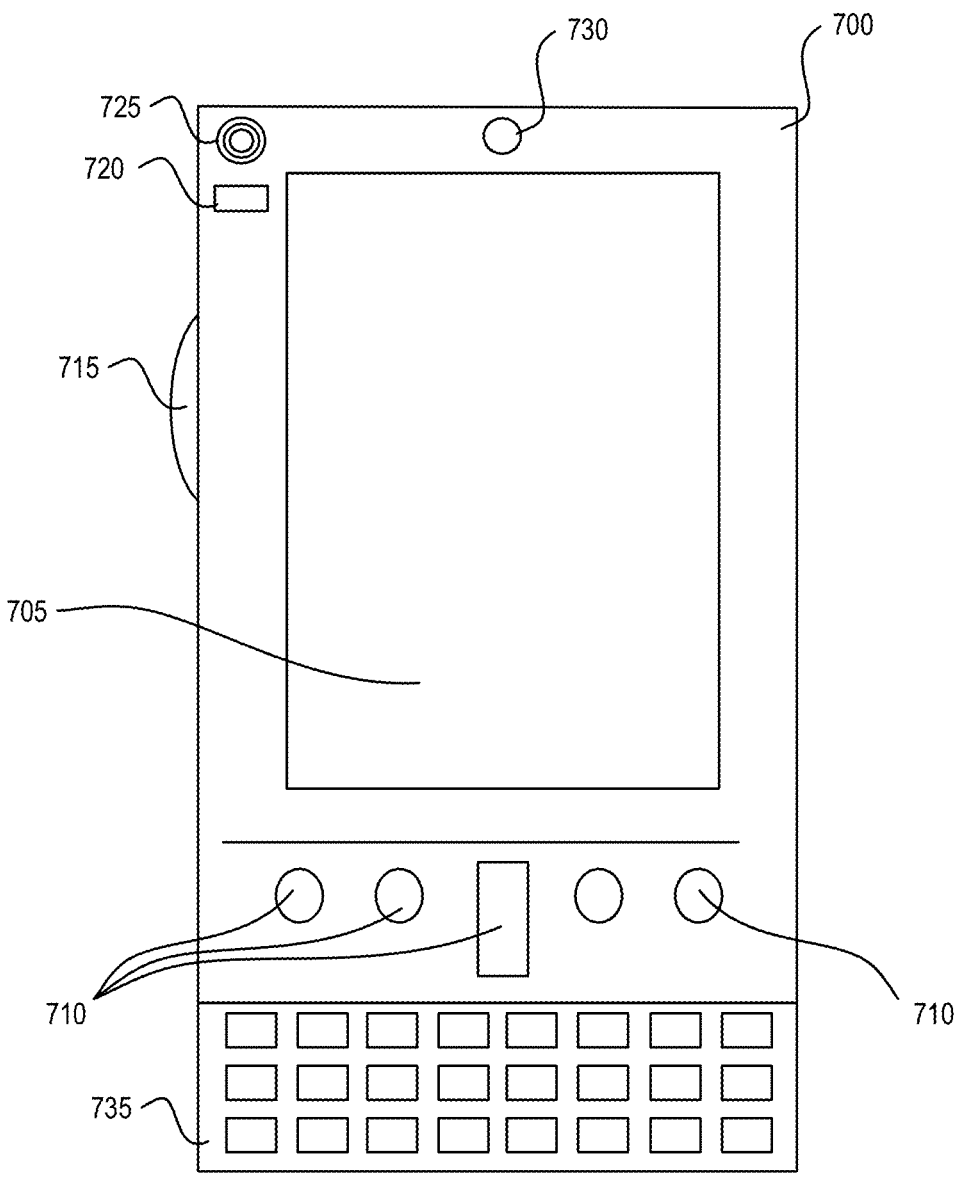
FIGS. 7 and 8 are simplified block diagrams of a mobile computing device with which aspects of the present disclosure may be practiced.
Figure 8:
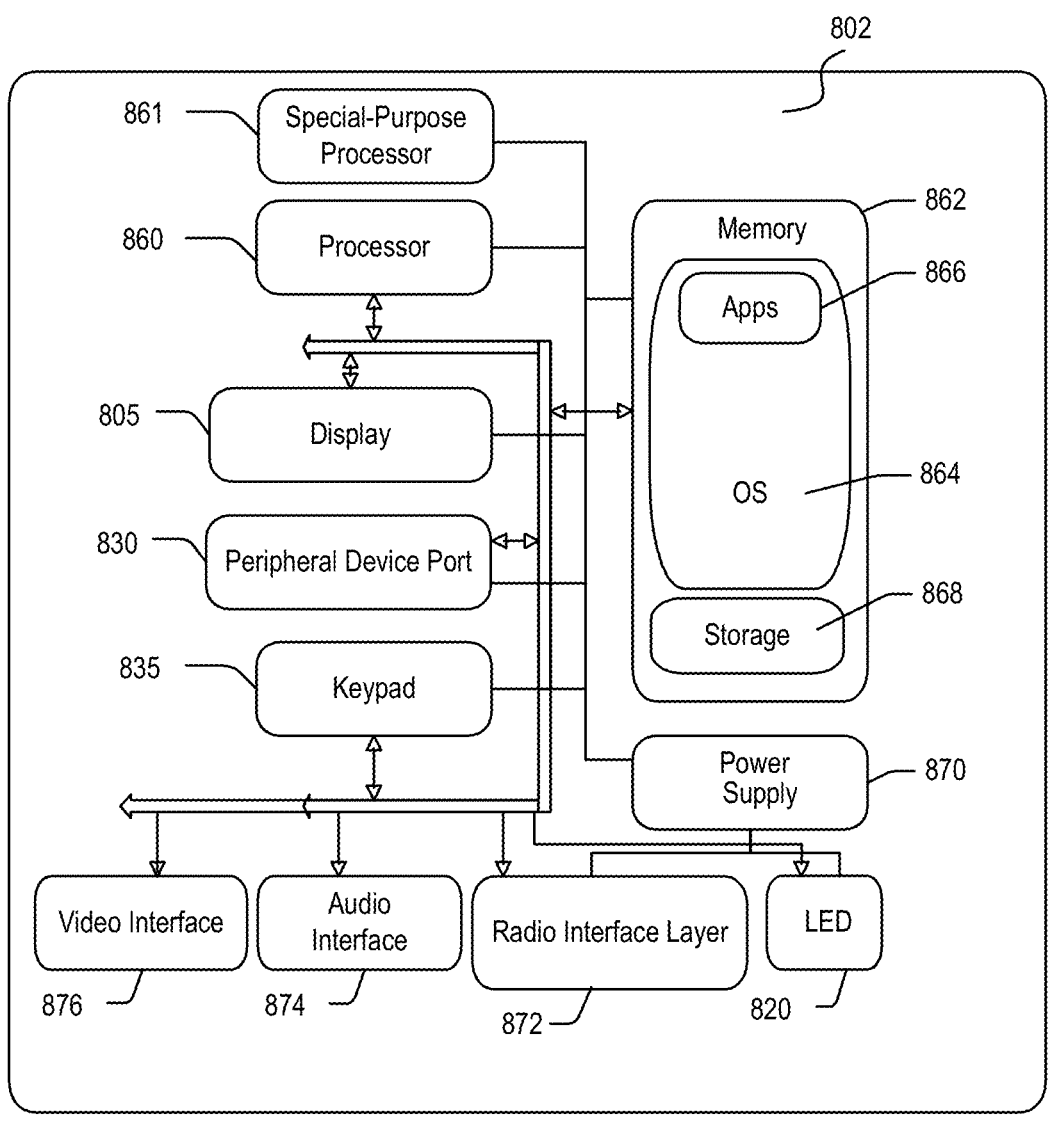

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing an image processor application 620 on a computing device (e.g., computing device 110 or 120), including computer executable instructions for image processor application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running image processor application 620, such as one or more components with regard to FIGS. 1 and 2, and, in particular, image processor 621 (e.g., corresponding to image processor 112 or image processor 210), prompt processor 622 (e.g., corresponding to prompt processor 116 or prompt processor 240), augmentation processor 623 (e.g., corresponding to augmentation processor 114 or augmentation processor 220), and neural network model 624 (e.g., corresponding to neural network model 118).

The operating system 605, for example, may be suitable for controlling the operation of the computing device 600. Furthermore, examples of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., image processor application 620) may perform processes including, but not limited to, the aspects, as described herein. Other program modules that may be used in accordance with aspects of the present disclosure, and in particular for training an image processor, may include image processor 621, prompt processor 622, augmentation processor 623, and/or neural network model 624.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some examples. In yet another alternative example, the mobile computing device 700 is a portable phone system, such as a cellular phone. The mobile computing device 700 may include a front-facing camera 730. The mobile computing device 700 may also include an optional keypad 735. Optional keypad 735 may be a physical keypad or a "soft" keypad generated on the touch screen display. In various examples, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one example, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone. The system 802 may include a display 805 (analogous to display 705), such as a touch-screen display or other suitable user interface. The system 802 may also include an optional keypad 835 (analogous to keypad 735) and one or more peripheral device ports 830, such as input and/or output ports for audio, video, control signals, or other suitable signals.

The system 802 may include a processor 860 coupled to memory 862, in some examples. The system 802 may also include a special-purpose processor 861, such as a neural network processor. One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated example, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with examples of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or micro-controller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for training an image processor having a neural network model, the method comprising:

generating a first training set of images having a first image resolution;

generating a second training set of images having a second image resolution, wherein the second image resolution is larger than the first image resolution, and the first training set has more images than the second training set;

training the neural network model of the image processor using the first training set of images during a first training session; and training the neural network model of the image processor using the second training set of images during a second training session after the first training session.

2. The method of claim 1, the method further comprising:

generating a third training set of images having a third image resolution, wherein the third image resolution is larger than the second image resolution;

training the neural network model of the image processor using the third training set of images during a third training session after the second training session.

3. The method of claim 1, wherein subjects of images of the first training set are distinct from subjects of images of the second training set.

4. The method of claim 1, wherein:

the neural network model comprises a noise processor having convolution layers and attention layers; and the method further comprising freezing at least some of the attention layers of the noise processor during at least one of the first training session and the second training session.

5. The method of claim 4, wherein freezing the at least some of the attention layers comprises freezing all of the attention layers of the noise processor during the at least one of the first training session and the second training session.

6. The method of claim 5, wherein freezing the at least some of the attention layers comprises freezing all of the attention layers of the noise processor during both of the first training session and the second training session.

7. The method of claim 1, wherein:
the neural network model comprises a noise processor; and
training the neural network model of the image processor using the first training set of images during the first training session comprises:
    augmenting at least some images of the first training set;
    adding the augmented images to the first training set.

8. The method of claim 7, wherein augmenting the at least some images comprises cropping an image of the at least some images.

9. The method of claim 7, wherein augmenting the at least some images comprises processing an image of the at least some images using a style filter.

10. The method of claim 7, wherein the method further comprises:
    generating a plurality of tokens that represent an image of the first training set using an image encoder;
    generating a prompt for the noise processor using a subset of the plurality of tokens;
    encoding the prompt using a text encoder;
    conditioning the noise processor using the encoded prompt.

11. A method for training an image processor having a neural network model with a noise processor, the method comprising:
    generating a first training set of images;
    augmenting at least some images of the first training set;
    adding the augmented images to the first training set;
    generating a second training set of images, wherein the second training set of images is different from the first training set, and the first training set has more images than the second training set;
    training the neural network model of the image processor using the first training set of images during a first training session; and
    training the neural network model of the image processor using the second training set of images during a second training session after the first training session.

12. The method of claim 11, wherein:
augmenting the at least some images comprises cropping a first image of the at least some images to generate a first augmented image; and
adding the augmented images to the first training set comprises adding the first augmented image to the first training set.

13. The method of claim 12, wherein:
augmenting the at least some images comprises cropping the first image to generate a second augmented image having a different crop boundary from the first augmented image; and
adding the augmented image to the training set comprises adding the second augmented image to the first training set.

14. The method of claim 11, wherein:
augmenting the at least some images comprises processing a first image of the at least some images using a style filter to generate a first augmented image; and
adding the augmented image to the first training set comprises adding the first augmented image to the first training set.

15. The method of claim 14, wherein:
augmenting the at least some images comprises cropping a second image of the at least some images to generate a second augmented image; and
adding the augmented images to the first training set comprises adding the second augmented image to the first training set.

16. A system for training an image processor having a neural network model, the system comprising:
    the image processor having the neural network model, the neural network model having a noise processor;
    an augmentation processor configured to process input images to generate a first training set of images having a first image resolution and configured to process input images to generate a second training set of images having a second image resolution, wherein the second image resolution is larger than the first image resolution, and the first training set has more images than the second training set;
    wherein the noise processor is trained using the first training set of images during a first training session and using the second training set of images during a second training session, wherein the second training session is after the first training session.

17. The system of claim 16, the system further comprising:
    an image encoder configured to generate a plurality of tokens that represent the input images;
    a prompt processor configured to generate prompts for the noise processor using a subset of the plurality of tokens;
    wherein the image processor is configured to condition the neural network model based on the prompt;
    wherein the conditioned neural network model is configured to denoise augmented images that are based on the first training set of images to generate output images corresponding to the input images.

18. The system of claim 17, wherein:
the noise processor comprises convolution layers and attention layers; and
at least some of the attention layers are frozen during at least one of the first training session and the second training session.

19. The system of claim 17, wherein the augmentation processor is further configured to process at least some input images to generate the augmented images.

\* \* \* \* \*